March 18, 1930.  J. H. HUNT ET AL  1,751,086
VEHICLE WHEEL
Filed Nov. 29, 1927   2 Sheets-Sheet 2
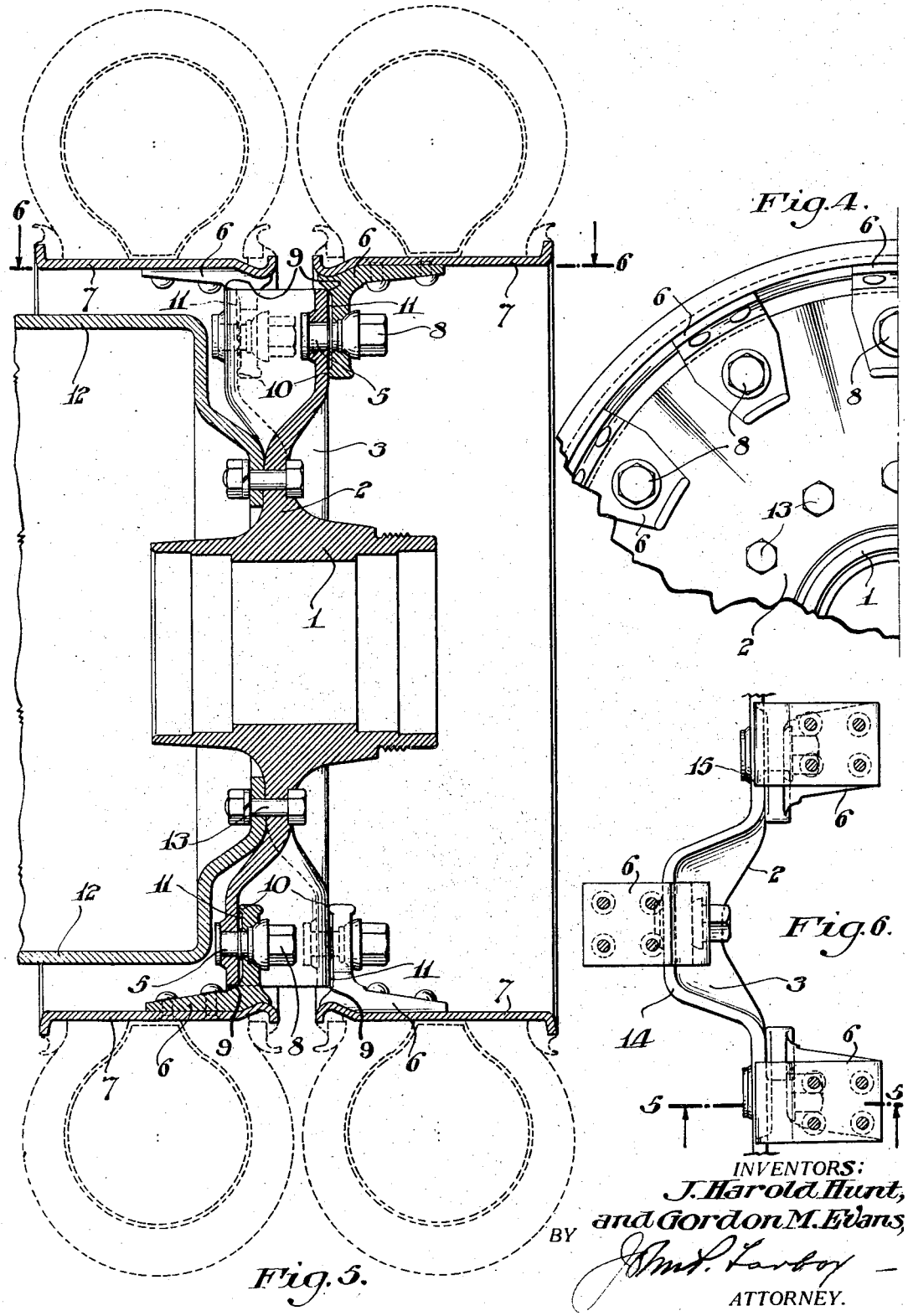
INVENTORS:
J. Harold Hunt,
and Gordon M. Evans,
BY
ATTORNEY.

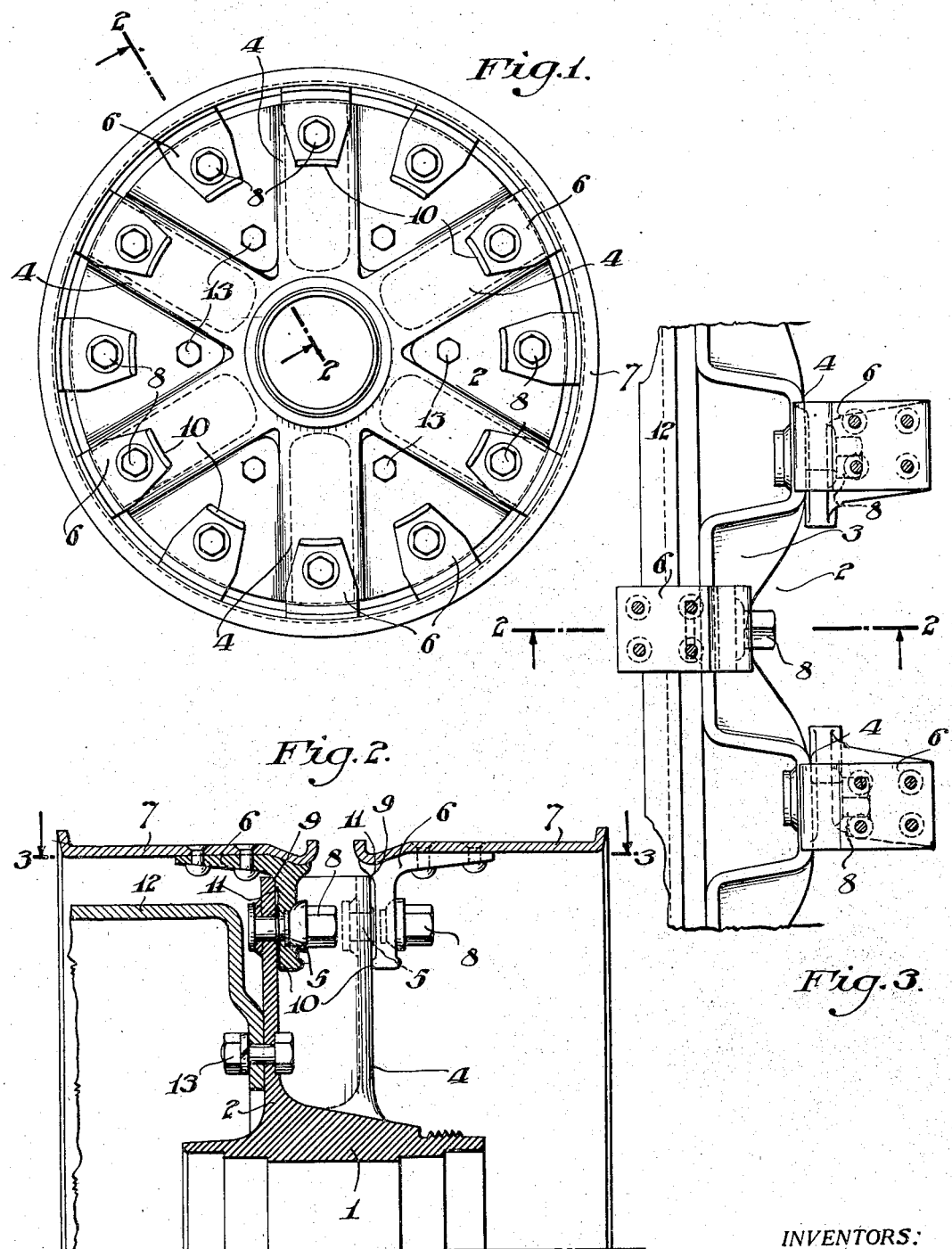

Patented Mar. 18, 1930

1,751,086

UNITED STATES PATENT OFFICE

J. HAROLD HUNT, OF DETROIT, MICHIGAN, AND GORDON M. EVANS, OF NEW YORK, N. Y., ASSIGNORS TO BUD WHEEL COMPANY, OF PHILADELPHIA, PENNSYLVANIA, A CORPORATION OF PENNSYLVANIA

VEHICLE WHEEL

Application filed November 29, 1927. Serial No. 236,398.

This invention relates to a vehicle wheel, being particularly directed to a wheel of the dual rim type.

Ordinarily wheels of this type have independent discs or sets of spokes connected to or integral with the hub for each rim. Constructions of this nature are expensive to manufacture, require a large amount of material, and result in wheels which are normally heavier than necessary.

The principal object of the present invention is to provide a dual rim wheel which is less expensive to manufacture than the usual dual rim type and substantially as economical as the single rim type, although possessing equivalent or greater strength than the former type, with the comparative lightness of the latter.

Other objects and advantages will hereinafter appear as the description of specific embodiments progresses.

In its broadest aspect the invention contemplates providing a single disc member having its outer periphery formed into alternating portions lying in spaced vertical planes. It is proposed to connect with each set of alternating portions a tire rim extending in opposite directions from each other but secured to the same side of the disc.

A convenient manner of constructing such a wheel is to corrugate the disc and mount one of the sets of rims on the peaks of the corrugations and the other in the valleys of the corrugations. Of course, the securing lugs of both rims would be accessible from the outside of the disc. A further development of the idea exists in forming the corrugations alternately of triangular and rectangular lateral projection; the rectangular lateral projection giving the wheel from the outside the full appearance of a wheel having straight sided spokes of rectangular cross-section.

Details of the manner in which the rims are connected to the disc, and the latter to the hub, if not integrally formed therewith, may vary considerably. The following description will set forth an arrangement which appears to efficiently accomplish such connection, although undoubtedly there are others within the purview of the invention.

The method by which the wheels are made is immaterial so far as this application is concerned, it being understood that various methods might be employed to produce wheels structurally similar.

Specific embodiments are illustrated in the accompanying drawings, wherein—

Fig. 1 shows in outside elevation a wheel constructed in accordance with the invention, Fig. 2 is a radial section taken on the line 2—2 of either Fig. 1 or Fig. 3, Fig. 3 is a horizontal section on the line 3—3 of Fig. 2, Fig. 4 is a fragmentary outside elevation of another form of wheel embodying the invention, Fig. 5 is a radial section of the form shown in Fig. 4, and is similar to Fig. 2, but is taken through a peak of the corrugations, as indicated by line 5—5 of Fig. 6, and Fig. 6 is a horizontal section on line 6—6 of Fig. 5.

The wheel, as shown in the drawings, is primarily intended for use as a motor truck wheel, such intention, however, not limiting its use solely thereto should other use become desirable. In other words, the invention appears at this time more applicable to truck wheels, although it is also capable of being adapted for other types.

At the start of the specific description it should be reiterated that the method of manufacturing the wheels is not a part of this application, and that the forms shown are understood to be produced by forging, rolling or by some other method.

Likewise, it might be desirable to form the disc separate from the hub, so the fact that integral hubs and discs are shown herein is not to be construed as a limitation to such construction. Also the number of corrugations may vary according to the nature of the wheel to be produced, or other changes may be made in the construction, without departing from the basic nature of the invention.

The wheel, shown in Figs. 1 to 3, is made up of a hub, generally indicated as 1, from which extends the disc 2. This disc is corrugated from its outer periphery substantially to the hub to form in effect spokes. The corrugations are alternately of triangular and rectangular lateral projection, as indicated at 3 and 4, respectively. The number of corrugations may vary, there being shown six of each form.

Each corrugation will be provided adjacent the outer periphery of the disc with a riveted stud 5 projecting through the disc to the outside thereof. A bracket or lug 6 will be mounted on each stud, such brackets being permanently prefixed by riveting or otherwise to a tire rim 7. The brackets with their attached rims will be secured to the discs by nuts 8 having a conical portion seating in a complementary portion in the brackets. The brackets or lugs are each provided with an impinging surface 9 and ball seat 10, leaving an open space 11 between the bracket and disc. This insures an efficient connection between the wheel elements. The two rims with their connected brackets are both secured to the outer side of the disc, the rim secured to the corrugation 3 extending inwardly of the wheel and the rim secured to the corrugations 4 extending outwardly of the wheel. A brake drum 12 is secured to the disc by bolts or other means 13 extending therethrough at the inward crests or valleys of the corrugations 3.

The wheel shown in Figs. 4 to 6 is similar to the previously described one in a broad sense, although there are important differences. The parts of this wheel which are structurally the same as the other are designated by the same reference characters and will only be referred to in general terms. The disc 2 of the modified form is not corrugated from the periphery to the hub, but has the corrugations therein extending from a point a substantial distance outside of the hub to the outer periphery. This in effect gives the inner portion of the disc the appearance of an ordinary disc. A further difference appearing in this form is the configuration of the corrugations 14 and 15 which are not of different shaped lateral projection but are substantially of the same shape and curvature. The brake drum 12 in this form is secured to the disc in its plane portion rather than the inner set of corrugations as in the other wheel.

The foregoing description is thought to have clearly set forth the structure of the wheels illustrated in the drawings and to have made the nature of the invention apparent.

The advantages inherent in the invention are numerous. Of course, one of the main advantages resides in the cheapness of a wheel so constructed. A rapid comparison of the old type of dual rim wheels with those shown herein indicates that the amount of necessary material is reduced since only one disc is used in place of the plurality heretofore necessary, and in the same ratio and for the same reason a large reduction in time and labor occurs in the production thereof. Another significant advantage rests in the greatly lessened weight of the wheel over the older type. This advantage follows naturally along with those previously set out since the amount of material forming the wheel is so much less. Notwithstanding this greatly reduced weight, the wheel possesses greater strength than the older type. The peaks and valleys of the corrugations being tied up around the periphery of the wheel by the tire rims, truss like constructions result which give a maximum strength for a minimum weight. This is also true of the form wherein the brake drum is secured to the inner side of the valleys of corrugations, thereby creating in addition a third truss construction. Since the corrugations extend to the periphery of the disc and the rims are attached in the peaks and valleys thereof to one side of the disc so as to project in opposite directions from each other, it will be observed that the troughs or depressions of the corrugations are unobstructed at their ends. This effects the decided advantage of allowing dirt and water free exit from the wheel. Other advantages are the ease of assembly in changing the rims and the neat appearance of the wheel as a whole.

The following claims are intended to cover, within their scope, the various modifications and adaptations which the invention may take.

What we claim is:—

1. In a vehicle wheel, a single disc wheel body having its outer peripheral portion formed with radial corrugations to provide transversely offset portions, and a pair of tire supporting rims secured to said offset portions.

2. In a vehicle wheel, a single disc wheel body formed with radial corrugations extending to the periphery of the disc and providing transversely offset portions, and a pair of tire supporting rims, attachable and removable from the outer side of the disc and demountably secured to said offset portions.

In testimony whereof we hereunto affix our signatures.

J. HAROLD HUNT.
GORDON M. EVANS.